US007685206B1

(12) United States Patent
Mathew et al.

(10) Patent No.: US 7,685,206 B1
(45) Date of Patent: Mar. 23, 2010

(54) AUTHORIZATION AND ACCESS CONTROL SERVICE FOR DISTRIBUTED NETWORK RESOURCES

(75) Inventors: Ashvin Joseph Mathew, Kirkland, WA (US); Costel Radu, Redmond, WA (US); David Walter Bailey, Bellevue, WA (US); Barry I. Kelman, Woodinville, WA (US); Walter Oliver, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1201 days.

(21) Appl. No.: 10/777,493

(22) Filed: Feb. 12, 2004

(51) Int. Cl.
*G06F 7/00* (2006.01)

(52) U.S. Cl. ...................................................... 707/785

(58) Field of Classification Search ..................... 707/2, 707/9, 783–787
See application file for complete search history.

(56) References Cited

U.S. PATENT DOCUMENTS

| | | | | |
|---|---|---|---|---|
| 5,944,824 | A | 8/1999 | He | |
| 6,014,666 | A | 1/2000 | Helland et al. | |
| 6,092,196 | A | 7/2000 | Reiche | |
| 6,092,199 | A | 7/2000 | Dutcher et al. | |
| 6,311,275 | B1 | 10/2001 | Jin et al. | |
| 6,571,279 | B1 | 5/2003 | Herz et al. | |
| 6,742,114 | B1 | 5/2004 | Carter et al. | |
| 6,850,252 | B1 * | 2/2005 | Hoffberg | 715/716 |
| 6,859,212 | B2 | 2/2005 | Kumar et al. | |
| 6,904,600 | B1 | 6/2005 | James et al. | |
| 6,909,708 | B1 * | 6/2005 | Krishnaswamy et al. | 370/352 |
| 7,124,101 | B1 * | 10/2006 | Mikurak | 705/35 |
| 7,207,041 | B2 * | 4/2007 | Elson et al. | 718/104 |
| 7,367,044 | B2 * | 4/2008 | Fowler et al. | 726/1 |
| 2002/0064149 | A1 * | 5/2002 | Elliott et al. | 370/352 |
| 2002/0128995 | A1 | 9/2002 | Muntz et al. | |
| 2002/0133579 | A1 * | 9/2002 | Bernhardt et al. | 709/223 |
| 2002/0138572 | A1 * | 9/2002 | Delany et al. | 709/204 |
| 2002/0147810 | A1 * | 10/2002 | Traversat et al. | 709/224 |
| 2002/0165960 | A1 | 11/2002 | Chan | |
| 2002/0184496 | A1 | 12/2002 | Mitchell et al. | |
| 2003/0115201 | A1 | 6/2003 | Krishnamoorthy | |
| 2003/0131020 | A1 | 7/2003 | Karamanolis et al. | |
| 2003/0154403 | A1 | 8/2003 | Keinsley et al. | |
| 2003/0163438 | A1 * | 8/2003 | Barnett et al. | 707/1 |

(Continued)

OTHER PUBLICATIONS

"A Brief Introduction to XACML", available at http://www.oasis-open.org/committees/download.php/2713/Brief_Introduction_to_XACML.html, printed Dec. 20, 2003, 5 pages, Sun Microsystems, Inc., U.S.A.

(Continued)

*Primary Examiner*—James Trujillo
*Assistant Examiner*—Linh Black
(74) *Attorney, Agent, or Firm*—Senniger Powers LLP

(57) ABSTRACT

Providing access to a resource via authorization data that conditionally defines the access by an expression that identifies the resource by name and by at least one property of the resource. An authorization service issues the authorization data (e.g., as a token) and evaluating authorization data received from a client. The authorization service evaluates the expression in the authorization data to identify the resource and determine the rights associated with the user for the resource. The authorization service implements role-based access control to control access to resources in a distributed, multi-site network.

25 Claims, 8 Drawing Sheets

U.S. PATENT DOCUMENTS

| | | | | |
|---|---|---|---|---|
| 2003/0217288 | A1 | 11/2003 | Guo et al. | |
| 2004/0088348 | A1* | 5/2004 | Yeager et al. | 709/202 |
| 2004/0205243 | A1 | 10/2004 | Hurvig et al. | |
| 2005/0004875 | A1* | 1/2005 | Kontio et al. | 705/52 |
| 2005/0131830 | A1 | 6/2005 | Juarez et al. | |
| 2008/0010365 | A1* | 1/2008 | Schneider | 709/223 |

OTHER PUBLICATIONS

Barkley, John, "Comparing Simple Role Based Access Control Models and Access Control Lists", Aug. 11, 1997,6 pages, National Institute of Standards and Technology, U.S.A.

Barkley, John F. et al., "Role Based Access Control for the World Wide Web", Apr. 8, 1997, 11 pages, National Institute of Standards and Technology, U.S.A.

Bertino, Elisa et al., "Secure and Selective Dissemination of XML Documents", ACM Transactions on Information and System Security (TISSEC), Aug. 2002, vol. 5, Issue 3, pp. 290-331, ACM Press, New York, U.S.A.

Beznosov, Konstantin et al., "A Resource Access Decision Service for CORBA-based Distributed Systems", May 28, 1999, School of Computer Science, University Park, Miami, Florida, 12 pages, U.S.A.

Chandramouli, Ramaswamy, "Business Process Driven Framework for Defining an Access Control Service based on Roles and Rules", printed Dec. 2003, 17 pages, National Institute of Standards and Technology, U.S.A.

Ferraiolo, David et al., "Role Based Access Control", Proceedings of 15th National Computer Security Conference, 1992,11 pages, U.S.A.

Kraft, Reiner, "Designing a Distributed Access Control Processor for Network Services on the Web", Workshop on XML Security, 2002, pp. 36-52, ACM Press, New York, U.S.A.

Kuo, C. Joncheng et al., "Dynamically Authorized Role-Based Access Control for Secure Distributed Computation", Workshop on XML Security, 2002, pp. 97-103, ACM Press, New York, U.S.A.

McPherson, Dave, "Role-Based Access Control for Multi-tier Applications Using Authorization Manager", Microsoft TechNet, available at http://www.microsoft.com/technet/prodtechnol/windowsserver2003/maintain/security/athmanwp.asp, printed Dec. 31, 2003, 37 pages, Microsoft Corporation, U.S.A.

"Role Based Access Control", National Institute of Standards and Technology, available at http://csrc.nist.gov/rbac/, printed Dec. 31, 2003, 5 pages.

Sandhu, Ravi et al., "The NIST Model for Role-Based Access Control: Towards a Unified Standard", RBAC 2000, 2000, pp. 47-63, ACM Press, New York, U.S.A.

Samar, "Single Sign-On Using Cookies for Web Applications," Enabling Technologies: Infrastructure for Collaborative Enterprises Proceedings, IEEE 8th International Workshops, Jun. 16, 1999, pp. 158-163.

"Microsoft.net Passport Review Guide," Jan. 2004, Microsoft, pp. 1-35, U.S.A.

* cited by examiner

AUTHORIZATION AND ACCESS CONTROL SERVICE FOR DISTRIBUTED NETWORK RESOURCES

TECHNICAL FIELD

Embodiments of the present invention relate to the field of resource access control. In particular, embodiments of this invention relate to providing access to a resource by conditionally specifying the resource by name and by at least one resource property.

BACKGROUND OF THE INVENTION

Web sites such as Internet sites often provide resources such as information, products, services, and the like to their users. In distributed services such as web services, access refers to the capability to do something with a service or a service's resource (e.g. execute, change, view, and create). Access control is the mechanism by which this capability is explicitly enabled or restricted in some way. Access control systems can dictate who or what process may have access to a specific resource as well as what type of access is permitted. These controls can be implemented within the service itself or external services and applications that interoperate with the service. With the proliferation of web services, it is important to define and enforce access to various resources over a distributed network.

Role-based authorization systems allow access to a resource by role. A role identifies the permissions, tasks, responsibilities, or qualifications of a user or a group of users. Conventional role-based systems define access to the resource by associating a specific role with a specific resource. However, such conventional systems are limited to specifying resources generally.

Accordingly, an improved access control system is desired to address one or more of these and other disadvantages.

SUMMARY OF THE INVENTION

Embodiments of the invention include providing access to a resource. One embodiment includes an authorization service controlling access to resources by assigning rights to entities that need to access the resources. The authorization service issues authorization data that is tightly bound to the resource being accessed or authorization data that applies to a group of resources (e.g., global). The authorization data is signed and valid for a given time period. The resource that is being accessed checks the validity of the authorization data (e.g., via the signature and expiration date). The authorization service allows the authorization of resources in distributed services to be centrally managed. In turn, centrally managing resource authorization enables scalable management of access control. In an embodiment, the authorization service provides role-based access control to resources to simplify access control management across resources associated with multiple services (e.g., central management of distributed services). The invention allows administrators to specify access control in terms of the roles within an organization and enables federation scenarios by enabling granular control of access to resources.

In other words, embodiments of the invention provide role-based authorization allowing conditional specification of a resource by name and by at least one property of the named resource. Moreover, the invention provides a single and consistent point of access control management for resources, makes access control administration manageable and scalable, and facilitates the implementation of business rules or policies. The invention improves security by increasing the granularity and manageability of access control. The invention enhances the level of control sponsors have over their domain namespaces and creates an audit trail of success and failure on every access check.

In accordance with one aspect of the invention, a method provides access to a resource for one or more users. The method includes receiving a request to issue authorization data for a user based on access rights associated with the user. The access rights include an expression that identifies the resource by a resource name and by a property associated with the resource to conditionally defining access to the resource. The method also includes issuing the authorization data responsive to the received request.

In accordance with another aspect of the invention, a method validates authorization data to provide access to a resource for one or more users. The method includes receiving authorization data associated with one of the users. The authorization data includes an expression identifying a resource by a resource name and by a property associated with the resource. The method includes retrieving validation information from the received authorization data. The method also includes evaluating the retrieved validation information to determine a validation status of the received authorization data. The method further includes sending a response indicating the determined validation status responsive to evaluating the retrieved validation information.

In accordance with yet another aspect of the invention, one or more computer-readable media have computer-executable components to control access to a resource by one or more users. The components include an interface component adapted to receive authorization data. The authorization data includes an expression identifying a resource by a resource name and by a property associated with the resource. The components also include a parser component adapted to retrieve validation information from the received authorization data. The components also include a validation component adapted to evaluate the retrieved validation information. The interface component is further adapted to send a response indicating the validation status of the received authorization data responsive to evaluating the retrieved validation information.

In accordance with still another aspect of the invention, an authorization system includes authorization data to store information to access a resource. The authorization data includes an expression identifying the resource by a resource name and by a property associated with the resource. The authorization data also includes computer-executable instructions for validating the authorization data to provide access to the resource.

In accordance with yet another aspect of the invention, a computer-readable medium stores a data structure defining access by a user to a resource. The resource has one or more properties. The data structure includes a header field representing validation information. The validation information includes a signature and an expiration date. The data structure also includes a source field representing an identity of the user. The data structure also includes a claim field specifying the resource conditionally. The claim field includes an expression identifying the resource by a resource name and by at least one of the properties.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
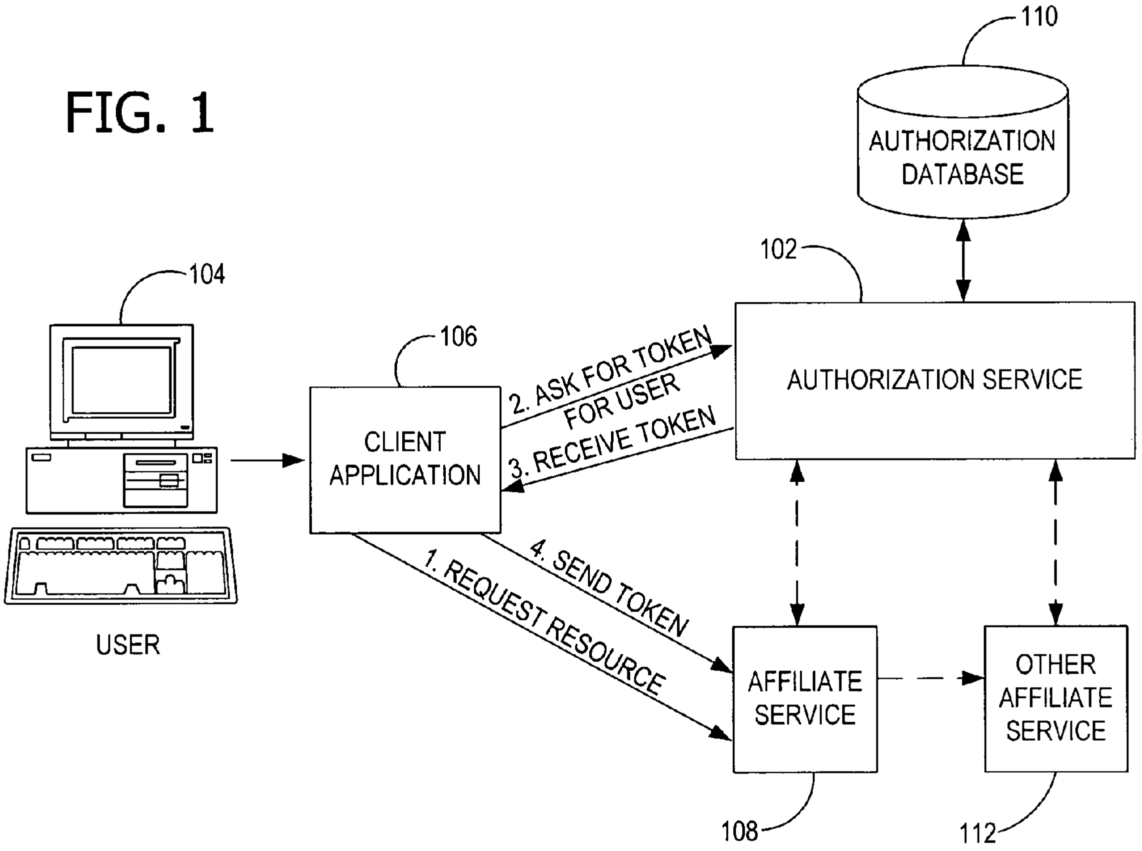
FIG. 1 is an exemplary block diagram illustrating issuance of authorization data by the authorization service.

An embodiment of the invention includes an access control system in which resources are conditionally specified by name and by a resource property. In particular, the invention includes a unified authorization mechanism (e.g., an authorization service as shown in FIG. 1) assigning and controlling access by a user or other entity to one or more resources (e.g., web sites). The authorization service maintains, manipulates, and evaluates authorization information for the various resources. The authorization service issues authorization data (e.g., a token) reflecting the access rights of a particular user to a particular resource. The resources interact with the authorization service to determine if the authorization data is valid. The resources then allow access to the user based on the authorization data. One embodiment of the invention further provides a single, uniform set of application programming interfaces (APIs) such as implemented according to the Simple Object Access Protocol (SOAP) to govern access to the resources by internal and external clients. The APIs may be secured by various security protocols.

The invention may be implemented as a stand-alone centralized system for access control of any web service. For example, there may be one central instance of the authorization service interacting with various web services or there may be multiple authorization services with each one interacting with a single web service (e.g., the authorization service executing as a JAVASCRIPT brand computer program on the client machine). The authorization data allows authorization information to be cached by the clients and allows the authorization service to scale. The invention may act as an extension to any authorization or authentication system (e.g., connected to the Internet). In one embodiment, the invention is implemented as part of a multi-site user authentication system as described in FIG. 8.

Roles, Claims, and Scopes

In one embodiment, the authorization service provides role-based access control to resources. Role-based access control (RBAC) is well known in the art as a mechanism by which access decisions are based on the roles of individual users (identities) as part of an organization or service usage model. That is, an administrator specifies access control in terms of the roles within the organization. Each user is assigned a predefined role (such as non-sponsoreduser, emailuser, charteruser, admin, charteradmin, and customer-servicerep).

In a role-based embodiment, the invention defines authorization in terms of roles, claims, and scopes. A claim is a statement that a client makes (e.g. name, identity, key, group, privilege, and capability). A resource is an abstract entity that can be the target of a claim. A scope is a named collection of resources specified by a conditional expression (e.g., a query). The scope represents the results of the queries over a given object type (e.g., a database). The scope is then the set of data that satisfies the conditions (e.g., the scope is a collection of resources defined through a query). Scopes may be static or dynamic. Static scopes include a collection of the resource identifiers. Dynamic scopes include a collection of resource identifiers that satisfy a scope definition. Depending on the context, scopes are also source scopes or target scopes. Source scopes define the resources that are attempting to gain access. A target scope defines the resources that are being accessed. The target scope is specified using a condition (e.g., mailbox[owner=userA]). The authorization service checks if the requested resource is within the target scope. For performance, scopes are also broken down into component groups of root scopes and sub-scopes that are relative to the root scope. A root scope specifies a resource or a group of resources in a hierarchical fashion. A claim defines the basic rights that a source scope has on the target scope. The authorization service of the invention defines claims over both the resources and the metadata pertaining to the resource (e.g., authorization/security_data[roles/claims/etc.]). Claims include, but are not limited to, one or more of the following: create, read, update, delete, and execute.

An enumeration scope includes a simple enumeration of resource identifiers with the same type. In one embodiment, an enumeration scope cannot be defined in terms of another scopes (i.e. cannot include other scopes). A conditional scope (as opposed to an enumeration scope) is a set of resources expressed by a query or condition. A conditional scope has the type of the resources specified by the query (e.g., the scope expression as described below). Conditional scopes are used, for example, in defining the basic roles, role templates, and resource authorization. A scope includes the name of an enumerated scope or the expression for a conditional scope.

The authorization service uses the concept of role as a collection of rights or claims (permissions), a scope as a named collection of objects or resources, and a group as a collection of users. The authorization service issues authorization data for a given target scope for a given source scope. In one embodiment, the authorization service is a thin SOAP service over an internal authorization library. The authorization service also provides methods to check the authorization for a given user and set of resources. An exemplary set of authorization service APIs is shown in Appendix A. In one embodiment, the APIs are accessible over a secure sockets layer (SSL).

Scope Expressions

An exemplary syntax of a scope expression as described herein promotes uniformity among various services in specifying scopes and resources. A scope expression specifies conditions on resources when used within a role definition. A scope expression specifies known properties of the resource when used as input during an access check by one of the services. Generally, a resource is specified as follows: resourcename[conditions]/properties[p1 . . . ]. In one example, a resource is specified as account[owner=Bob]. An exemplary role specifying a resource in this manner is as follows: Mailbox[folder=inbox]/properties[recipient], where mailbox is the resource, [folder=inbox] is the condition, and properties[recipient] is the property. The exemplary role may be stored in the authentication database and in the authorization data using claims such as "include" and "exclude."

An exemplary syntax of a scope expression is shown in Table 1 below.

TABLE 1

Exemplary Elements in a Syntax for the Scope Expression.

| Scope Element | Syntax | Description |
|---|---|---|
| Scope_expression | ConditionalScope | |
| ConditionalScope | /ResourceExpression/. . . /PropListExpression | A conditional scope starts with / and contains at least one resource expression. The PropListExpression is optional. |
| ResourceExpression | resource_keyword or resource_keyword[ListOfConditions] | |
| Resource_keyword | the name of the resource (predefined and configurable) | The keyword is unique within the set of resources. |
| ListOfConditions | Pair_Name Value . . . Pair_Name Value | List of pair-name values separated by spaces. |
| Pair_NameValue | PropertyName = 'PropValue' | For example, scopeid='EnumeratedScopeId' |
| EnumeratedScopeId | the ID of an enumerated scope | |
| PropertyName | reserved name (id, scopeid, name, type, etc) | |
| PropValue | any string enclosed within quotes or apostrophes | |
| PropListExpression | properties or properties[ListOfPropIds] | |
| ListOfPropIds | PropId PropId ... | This includes a list of property IDs separated by spaces. |
| PropId | Id or @EnumeratedScopeId | A property id is a string not containing white spaces or special characters. In addition, an indirect list of property ids can be specified by @EnumeratedScopeId. |

The resource keywords, the property names and the property IDs are defined by the applications using the authorization service. A library accessible by the authorization service includes a parsing function that transforms a scope expression in an internal structure that the scope evaluation provider can use. Keywords and names are case insensitive.

Examples of scope expressions include the following: /profile[DA='198']/properties[id_EMAIL], /credential[name='bob@pageA.net'], /DA[id='3'], /namespace/properties[id_propertyA], /profile[name='Joe@pageA.net']/properties[FirstName LastName], /site[url="kids.*.pageA.net" policygroup='101'], /credential[namespace='pageA.net']/properties[email]

Exemplary resource types and keywords include, but are not limited to, the following: profile, credential, DA, namespace, identity, policygroup, site, role, scope, and claim. Exemplary property names include, but are not limited to, the following: ID, name, type, NS, DA, scopeID, role, and claim. The syntax for ListOfPropIds allows the specification of an attribute either by ID or by name. For uniformity and cross-component compatibility, the list of property IDs includes IDs and not names.

Role Definitions

In the role-based embodiment, the roles include the scope information, the claims that pertain to the scope, and other data such as a policy governing the role. A basic role is a named collection of claims that act within specified scopes. Each group of claims has associated therewith an included/excluded set of scopes that defines the target set of resources for these claims. A role instance is an instantiation of a basic role for a source and a target set of resources. The role is assigned to the resources in the source scope and the granted claims will act upon the resources defined by the target scope. The target scope specifies the global set of resources on which the claims act. These resources may be further restricted by the include/exclude subscopes defined for each set of claims in the basic role. The role may be specified as an XML document created when the role is defined. The role definition includes several items that are not fully specified until the role is assigned to a resource. These items are expressed as metadata in the exemplary role definition as shown below. In one embodiment, the roles are managed by service APIs such as DefineRole and QueryRole.

An exemplary role template is shown below.

```
<RoleTemplate>
    <Role name='role-name'>
    <SourceScope>%SourceRootScope%</SourceScope>
    <TargetScope>%TargetRootScope%</TargetScope>
    <GrantClaims>
        <ClaimMap>
            <Claim>Read</Claim>
            <Claim>Update</Claim>
            <Include> scope expression </Include>
            <Include> . . . </Include>
            <Exclude> scope expression </Exclude>
            <Exclude> . . . </Exclude>
        </ClaimMap>
    </GrantClaims>
    <DenyClaims>
        <ClaimMap> . . . </ClaimMap>
    </DenyClaims>
</RoleTemplate>
```

The root scope or source scope defines the root from which the source and the targets are defined. The root scope allows role templates to be defined that may then be transformed depending on the actual instance. For example, while the RoleMap definitions may be the same for an administrative user from two different organizations, an instance for each administrative user is created. The source root scope specifies, for example, a user identity for which the authorization information is being generated. The SourceRootScope is specified by a scope expression. The target root scope specifies, for example, the scope for which the target is requesting the authorization data. This may be a ‘global’ target such as at a domain level. The TargetRootScope is specified by a scope expression. GrantClaims are explicit claim grants. In one embodiment, the authorization service implicitly denies every claim unless it is explicitly granted. A claim map is a collection of claims and scopes. The claims in a claim map apply equally to the resources specified by the include/exclude scope. DenyClaims are explicit claim denials.

The Role/@name field specifies the name of the role and is used as an identifier for the role. The Role/SourceScope field includes a unique identifier for a resource (e.g., a user account). The source root scope specifies the single resource to which this role instance is assigned. The Role/SourceScope/@type field specifies the resource type identified by the source scope. The Role/TargetScope field includes any expression representing a scope. The target root scope specifies the global set of resources that may be accessed in this role. This set of resources is further restricted by the include/exclude scopes for each claim in the basic role definition. There is no restriction on the target set of resources. When the role is evaluated, the claims that do not apply for the target root scope are omitted from the evaluation results. The Role/TargetScope/@type field specifies the resource type of the target scope. The Role/GrantClaims field includes an array of ClaimMap nodes that specifies the set of granted claims. The Role/DenyClaims field includes an array of ClaimsMap nodes that specifies the set of denied claims. The Role/GrantClaims/ClaimMap field includes a set of claims and the include/exclude sub-scopes to which the claims refer (e.g., the target of the action implied by the claim). The Role/GrantClaims/ClaimMap/Claim field includes the name of the granted claim. There may be multiple claim nodes working under the same sub-scopes. The Role/GrantClaims/ClaimMap/include field includes an array of scope expressions that define the set of included resources targeted by the claims. The scope_expr is a scope expression that defines the set of resources to be included. The Role/GrantClaims/ClaimMap/include/@type field specifies the type of the resources defined by the scope expression. The Role/GrantClaims/ClaimMap/exclude field includes an array of scopes that define the set of excluded resources. The scope_expr is a scope expression that defines the set of resources to be excluded. If missing, the excluded resource set is empty. The Role/GrantClaims/ClaimMap/exclude/@type field specifies the type of the resources defined by the scope expression.

In one example, the role “CSR” is defined with claims Read and Write over the profiles with the FirstName property equal to ‘abc’. The claims are excluded for credentials under the scope ‘classified’.

```
<Role name=‘CSR’>
    <GrantClaims>
        <ClaimMap>
            <Claim>Read<Claim>
            <Claim>Write<Claim>
            <include type=‘profile’>
                /profile[FirstName=‘abc’]
            <include>
            <exclude type=‘credential’>
                /credential[scopeid=‘Enum__Classified’]
            </exclude>
        </ClaimMap>
    </GrantClaims>
</Role>
```

Continuing the example above, the role is restricted to a specified namespace as shown below. The claims of Read and Write only apply for the profiles in the namespace pageA.net.

```
<Role name=‘CSR’>
    <target>
        /namespace[id=‘pageA.net’]
    </target>
    <GrantClaims>
        <ClaimMap>
            . . .
        </ClaimMap>
    </GrantClaims>
</Role>
```

An example role template describing permissions over a mailbox, calendar and profile resources is shown below. In particular, the user is given read access to the Inbox folder and calendar and read/write access to the profile property ‘Country’.

```
<Role name = “sample”>
    <GrantClaims>
            <claimmap>
            <claim>read</claim>
                <include>/mailbox[folder=‘Inbox’]</include>
            <include>/calendar[Level=‘All’]</include>
        <claimmap>
        <claimmap>
            <claim>read</claim>
            <claim>write</claim>
            <include>/profile/properties[Country]</include>
        </claimmap>
    </GrantClaims>
</RoleDefinition>
```

The SourceScope and the TargetScope are specified when the role is granted. Source is the resource (e.g., identity, site, or service) that receives the role (e.g., /identity[id=‘UserIDof (UserA)’]). Target is the identity that owns the resources specified by the granted role (e.g., /identity[id=‘UserIDof (UserB)’]). For example, User A is granted read access to the Inbox folder and the Calendar of User B and read/write access to User B’s profile property ‘Country’.

In another example, a role “CSR” grants permissions over user accounts. However, the “CSR” role should exclude access to resources accessible by a different, more powerful role “CSRManager”. The role definition for CSR comprises the following exclude scope to exemplify role grouping.

```
<claimmap>
    <claim>read</claim>
        <exclude>/profile[rolegrp = ‘CSRManager’]</exclude>
        <exclude>/credential[rolegrp = ‘CSRManager’]</exclude>
</claimmap>
```

The application or web service interacts with the authorization service via management APIs to, for example, define roles, grant roles, and deny roles. Granting a role assigns the role to a user or identity (i.e., the source scope) or a group of users. Exemplary role APIs for managing roles are shown in Appendix B.

Issuing Authorization Data

Referring first to FIG. 1, an exemplary block diagram illustrates issuance of authorization data for a user 104 by the authorization service 102 to a client. The client includes, but is not limited to, a user, a client application 106, a web service, a computing device, and an operating system component. The client application 106 in FIG. 1 attempts to access a resource owned or controlled by an affiliate service 108 (e.g., a web site). The affiliate service 108 requests authorization data from the client application 106. The client application 106, responsive to the request for authorization data, requests the authorization data (e.g., as a token) from the authorization service 102. The authorization service 102 receives the request to issue authorization data for the user 104 based on access rights associated with the user 104. The access rights, stored in an authorization database 110, conditionally define access to the resource by including an expression identifying the resource by a resource name and by a property associated with the resource. Responsive to the received request, the authorization service 102 issues the token to the client application 106. The authorization database 110 may be a single database or may be part of a distributed memory area network including a plurality of computing devices and memory areas. The invention provides a client interface for the administration and creation of the authorization data by the client application 106. The authorization service 102 encrypts, digitally signs, and time stamps (e.g., with an expiration date) the created authorization data.

In one embodiment, the authorization database 110 stores authorization data in tables such as Table 2 and Table 3 below.

TABLE 2

Exemplary Authorization Data including Source Scope, Role, and Target Scope.

| Source Scope | Role | Target Scope |
|---|---|---|
| Bob | OwnerProfile | Bob |
| Alice | OwnerProfile | Bob |
| Bob | OwnerMailboxCalendar | Bob |
| Alice | SharedMailboxCalendar | Bob |

TABLE 3

Exemplary Authorization Data including Role Name, Claim, and Resource.

| Role Name | Claim | Resouce |
|---|---|---|
| OwnerProfile | Read, Write | Passport Profile |
| OwnerMailboxCalendar | Read, Write | mailbox[folder='Inbox'] |
| OwnerMailboxCalendar | Read, Write | calendar[Level='All'] |
| SharedMailboxCalendar | Read | mailbox[folder='Inbox'] |
| SharedMailboxCalendar | Read | calendar[Level='Pubilc'] |

The client application 106 receives the token and sends the token to the affiliate service 108. The affiliate service 108 validates and evaluates the token (e.g., by interacting with the authorization service 102 or by trusting the content of the received token). Based on the token evaluation, the affiliate service 108 provides the client application 106 with access to the requested resource.

In one embodiment, the client application 106, the authorization service 102, and the affiliate services 108, 112 communicate over a secure sockets layer (SSL) in a network such as the Internet. In one embodiment, an application interacts with the authorization service 102 over a network such as the Internet. For example, the authorization service 102 may act to evaluate authorization data from multiple applications executing in a distributed computing environment. In another embodiment, the authorization service 102 executes on the same computing device as the requesting application. As such, the authorization service 102 executes locally.

The invention includes APIs for creating a token storing authorization data (GenerateAuthZToken, GenerateAuthZTokenForBinding). Further, in one embodiment, the authorization service 102 authenticates the affiliate service 108 (e.g., via digital certificates). The administrators for the affiliate service 108 login to the authorization service 102 and authenticate using a trusted certificate to access the APIs of the authorization service 102. Another API in this embodiment such as GenerateAuthZToken evaluates all the roles granted to a given resource within a targeted scope and returns a list of claims that apply for it. Such an API provides the affiliate service 108 and/or the user 104 with a way to cache authorization results. The affiliate server 108 and/or the user 104 then pass the authorization data received from the authorization service 102 to various affiliate services (e.g., other affiliate service 112) that use the information to authorize operations as indicated in FIG. 1 by dotted lines.

Authorization by the various affiliate services may be based solely on the information contained by the token or on information obtained from the authorization service 102 (e.g., as indicated by dotted lines connecting the affiliate services 108, 112 with the authorization service 102).

The authorization service 102 includes one or more computer-readable media having computer-executable instructions for performing the method illustrated in FIG. 1.

Authorization Data Structure

In one embodiment, the authorization data is embodied as an authorization token in extensible markup language (XML) format (e.g., using XPath). The authorization token is stored as a data structure on a computer-readable medium. The authorization token defines access to a resource having one or more properties. In one embodiment, the authorization token includes a header field representing validation information. The validation information includes a signature and an expiration date. In one example, the validation information further includes a site identifier identifying an application program or computing device associated with the user to enable a referrer check. The authorization token further includes a source field representing an identity of the user and a claim field specifying the resource conditionally. The claim field includes an expression identifying the resource by a resource name and by at least one of the properties (e.g., a set of the properties). In one example, the resource name identifies a group of resources.

In one embodiment, the token is domain-specific XML data digitally signed and/or encrypted by the authorization service. The digital signature is independent of the digital signature for a SOAP request that may be part of the network protocols. Encryption prevents the display in clear text of sensitive information concerning the rights a specific user has over a specific set of resources. The token includes a partial or complete description of the granted roles (including claims, resources, and target scopes). The token is issued and signed by the authorization service (e.g., via a function call such as GenerateAuthZToken). Client applications include the token in their calls (e.g., in a SOAP header). The authorization services check the validity of the token and grant or deny authorization for the operation.

An exemplary XML format for the authorization token in a role-based access control embodiment is shown below. Other formats, including those that are substantively and/or stylistically different from that shown below, are within the scope of the invention.

```
<authz>
    <header>
    </header>
    <body>
        <source type='resourcetype'>scope-expr-id</source>
        <RoleMap>
            <target type='resourcetype'>scope-expr</target>
            <target type='resourcetype'>scope-expr</target>
                ...
            <ClaimMap>
                <Claim>claim-name<Claim>
                <Claim>claim-name<Claim>
                ...
                <include type='resourcetype'>scope__expr</include>
                <include type='resourcetype'>scope__expr</include>
                    ...
                <exclude type='resourcetype'>scopeexpr</exclude>
                    ...
            </ClaimMap>
            <ClaimMap>
                ...
            </ClaimMap>
            ...
        <RoleMap>
    </body>
</authz>
```

The AuthZ/header field may include, for example, timestamp information and data supporting a digital signature or other security features. The AuthZ/body/source field includes a unique resource identifier (e.g., scope-expr-id). In one embodiment, the source root scope specifies the single resource for which this token was generated. The AuthZ/body/source/@type field specifies the resource type identified by the source scope. The AuthZ/body/RoleMap field specifies the claim/scope bindings for one role. There may be more then one RoleMap node. The AuthZ/body/RoleMap/target field includes a target expression representing a scope. If the token is unbound to a resource then the target root scope specifies the global set of resources that can be accessed in this role. If the token is bound, then this is one of the target scopes to which the token was bound. The AuthZ/body/RoleMap/target/@type identifies the resource type of the target scope. The AuthZ/body/RoleMap/ClaimMap includes a set of claims and the include/exclude scopes to which the claims refer. There may be multiple claim maps associated with different target scopes. In one embodiment, the node has the same content as the ClaimMap given in a role definition.

An exemplary authorization token is shown below.

```
<authz>
    <header></header>
    <body>
        <source type="1">/identity[id='UserIDof(UserA)']</source>
        <rolemap>
            <target type="1">/identity[id='UserIDof(UserA)']</target>
            <claimmap>
                <claim>2</claim>        <!-- read -->
                <claim>3</claim>        <!-- write -->
                <include>mailbox[folder='Inbox']</include>
                <include>calendar[Level='All']</include>
            </claimmap>
            <claimmap>
                <claim>2</claim>        <!-- read -->
                <claim>3</claim>        <!-- write -->
                <include>Profile<include>
            </claimmap>
        </rolemap>
    </body>
</authz>
```

In the above example, the claim code '2' indicates read permission and the claim code '3' indicates write permission.

Authorization Engine

The authorization service implements an authorization engine or other functionality to provide support functions for generating, parsing and evaluating authorization data, support functions for parsing the scope queries, and a mechanism to evaluate scopes and claims in the context of given authorization data and/or a specified target resource. The authorization engine does not define or assume any resource hierarchy and is agnostic with respect to the resource, claim, scope or role semantics.

Figure 2:
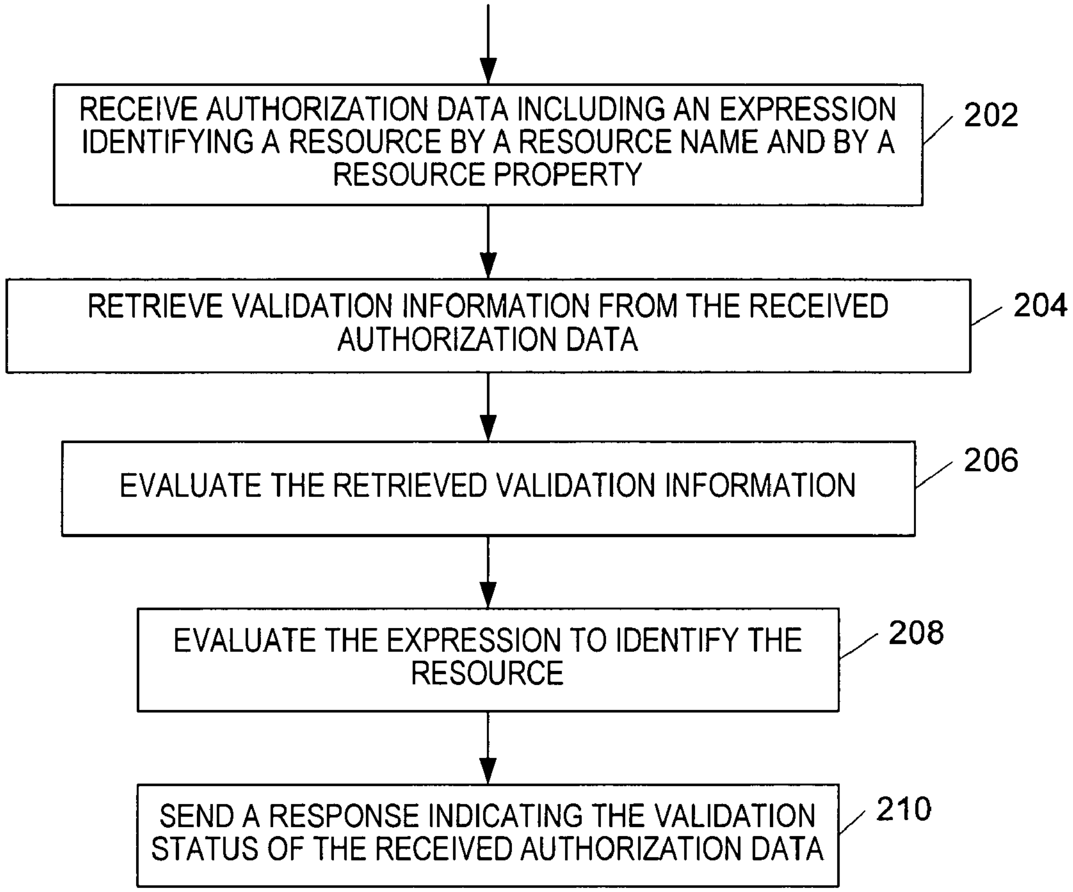
FIG. 2 is an exemplary flow chart illustrating evaluation of authorization data by the authorization service.

Referring next to FIG. 2, an exemplary flow chart illustrates evaluation of authorization data by the authorization service. The authorization service of the invention provides a mechanism that various affiliate services use to authorize service-specific operations over sets of resources. Because the authorization service is a resources-agnostic component, the specific conditions for authorizing an operation are decided and controlled by the affiliate service.

In one embodiment, the invention includes a method for validating authorization data to provide access to a resource. The method includes receiving authorization data (e.g., over SSL via a network such as the Internet) from a client such as an application program at 202. For example, the authorization data may include role information. The authorization data includes an expression identifying a resource by a resource name and by a property associated with the resource. In one form, receiving the authorization data includes receiving a data packet according to the Simple Object Access Protocol (SOAP) and extracting the authorization data from the received data packet. In another example, the authorization service decrypts the received authorization data. The authorization performs a referrer check by receiving an identifier from the application program, extracting another identifier from the received authorization data, and comparing the received identifier with the extracted identifier to determine the validity of the authorization data.

The method further includes retrieving validation information such as a digital signature and an expiration date from the received authorization data at 204. The method includes evaluating the retrieved validation information at 206 and evaluating the expression in the received authorization data to identify the resource at 208. For example, the authorization service evaluates the expression by extracting a target scope from the received authorization data. The extracted target scope identifies the resource. In one embodiment, the method evaluates the retrieved validation information by comparing the retrieved expiration date to a current time stamp to determine if the received authorization data has expired. The method includes sending a response to the client indicating the validation status of the received authorization at 210. For example, if the retrieved signature has been determined to be invalid or the received authorization data has been determined to be expired, the authorization service sends a response to the client indicating the invalidity of the received authorization data. If the authorization data is determined to be valid, the authorization service sends a response indicating the validation status of the received authorization data to the client.

The authorization service of the invention includes one or more computer-readable media having computer-executable instructions for performing the method illustrated in FIG. 2.

Figure 3:
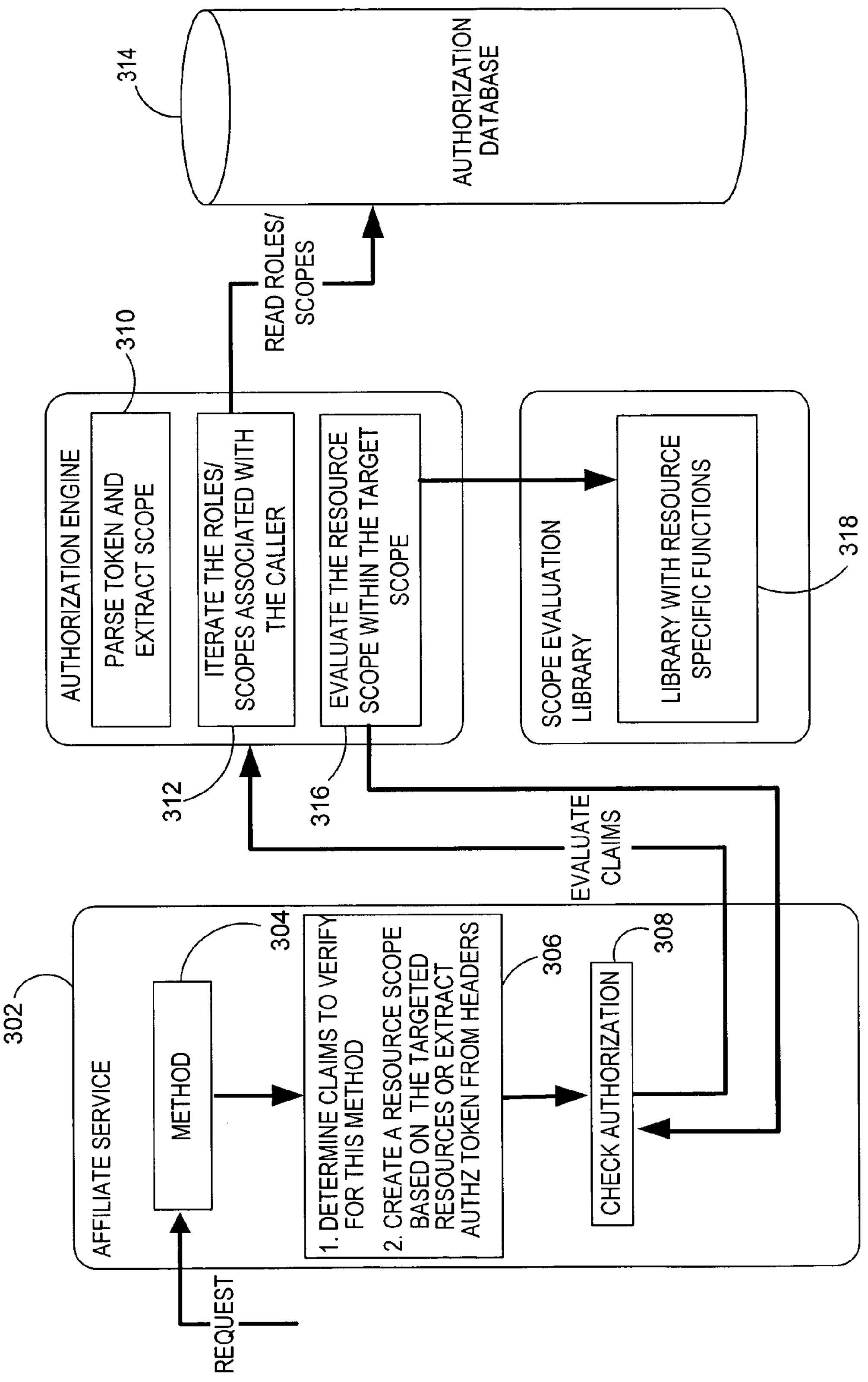
FIG. 3 is an exemplary flow chart illustrating interaction between an affiliate service and the authorization service during evaluation of the authorization data.

Referring next to FIG. 3, an exemplary flow chart illustrates the interaction between an affiliate service 302 and the authorization service during evaluation of authorization data. In one embodiment, authorization operates as follows. The affiliate service 302 receives a request from a client (e.g., user, application program, or operating system component) to execute a method 304 (e.g., a software routine or function call). The method 304 determines the claims needed and the calling identity that accesses the resources at 306. The method 304 extracts the authorization token from the received request or builds a scope query for the specific resources targeted by the caller further at 306. The service calls the authorization engine to check authorization at 308 and evaluate the client, target resource, and claims needed. The authorization service parses the token and extracts the scope for which the token was issued at 310. If no token is provided, the authorization service iterates over the roles associated with the client and determines the claims and their scopes at 312. In one embodiment, the authorization service obtains role and scope information from the authorization database at 314. The authorization service evaluates the extracted scopes against the resource scope at 316 established by the method 304. The evaluation is based on resource-specific procedures defined by the affiliate service 302 processing the request. The evaluation procedures in the exemplary flow chart are collected in a library accessible by the authorization service and each resource type has an associated evaluation function at 318.

Scope Evaluation

The authorization service transforms scope expressions to data structures such as trees to find/enumerate the nodes in the scope expression, to retrieve values for properties, or to determine if a given attribute is in the list of attributes. The internal scope structure includes a list of resource keywords and types, a list of name-value pairs for each resource keyword providing details and conditions about the resource, and a list of attribute keywords. Converting the input authorization data to a format similar to the authorization data stored by the authorization service in the authorization database enables efficient comparison and evaluation of the input authorization data. In one embodiment, the authorization service includes a tree comparator that takes two authorization trees as input and then traverses each tree to compare the claims.

In one embodiment, a library accessible by calls from the authorization service for scope evaluation includes custom, service-specific functions (e.g., evaluators) that determine whether a given resource is within the target scope of resources. The evaluator functions are registered based on the type of the target scopes. A global function dispatches the calls to the proper evaluator function. An exemplary evaluator function definition included the following:

bool EvaluateResourceInScope (ResourceScopeStruct, TargetScopeStruct)

The exemplary evaluator function returns TRUE if the resource is in the scope, and false otherwise. In general, the name-value pairs are interpreted as conditions in the target scope and are related by a logical AND operator (e.g., all the listed conditions must be satisfied). The evaluator function checks every condition name-value in the target using any of the information name-value in the resource. For example, if the resource is "profile[id='123' credname='abc@pageA.net']" and the target is "profile [namespace='pageA.net' DA='1']" then the evaluator can check namespace='pageA.net' using the information credname='abc@pageA.net' and will check DA='1' using the id='123 '.

Figure 4:
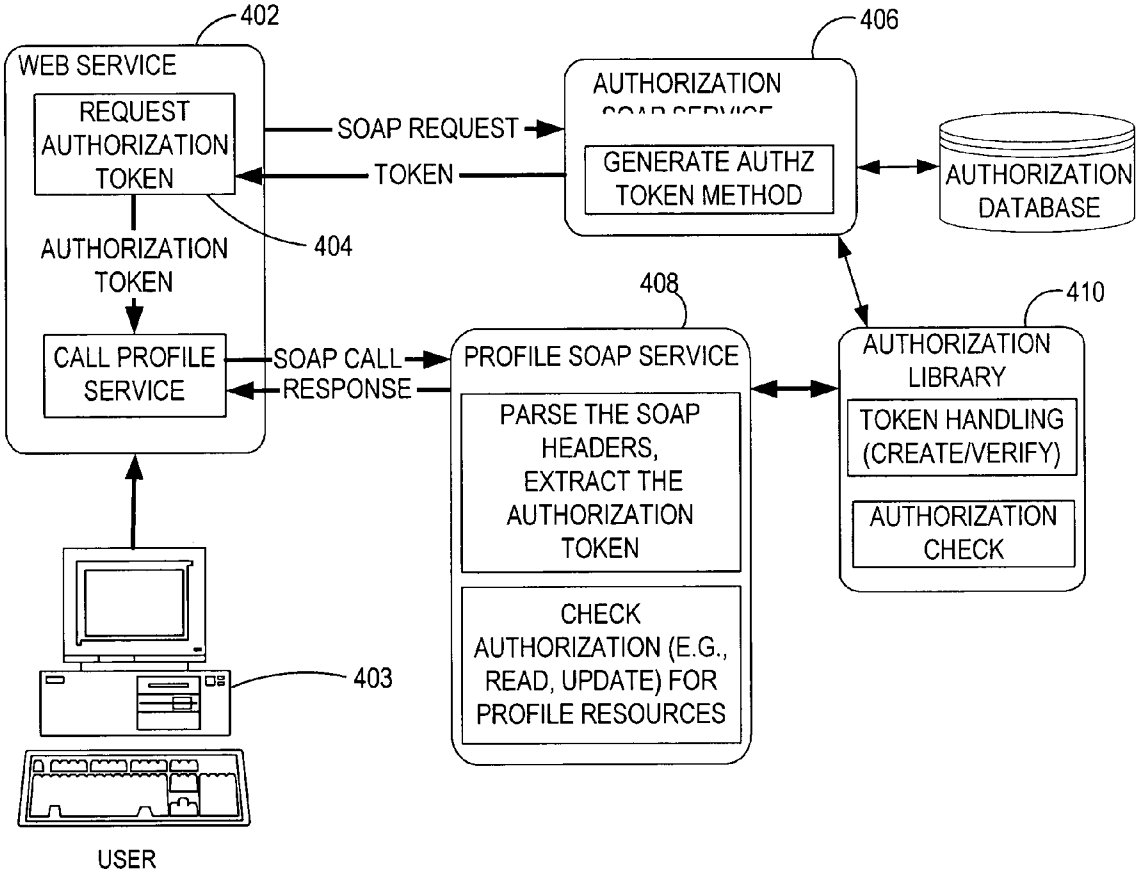
FIG. 4 is an exemplary block diagram illustrating issuance and evaluation of authorization data in a web service environment.

Referring next to FIG. 4, an exemplary block diagram illustrates issuance and evaluation of authorization data in a web service environment. In the example of FIG. 4, an affiliate service such as a web service 402 requests an authorization token at 404 on behalf of a user 403. The web service 402 interacts with an authorization SOAP service 406 to obtain the token. The web service 402 interacts with a profile SOAP service 408 to subsequently evaluate and validate the authorization token. Both the authorization SOAP service 406 and the profile SOAP service 408 communicate with an authorization library to access functionality suitable to both services.

Authorization Components

Figure 5:
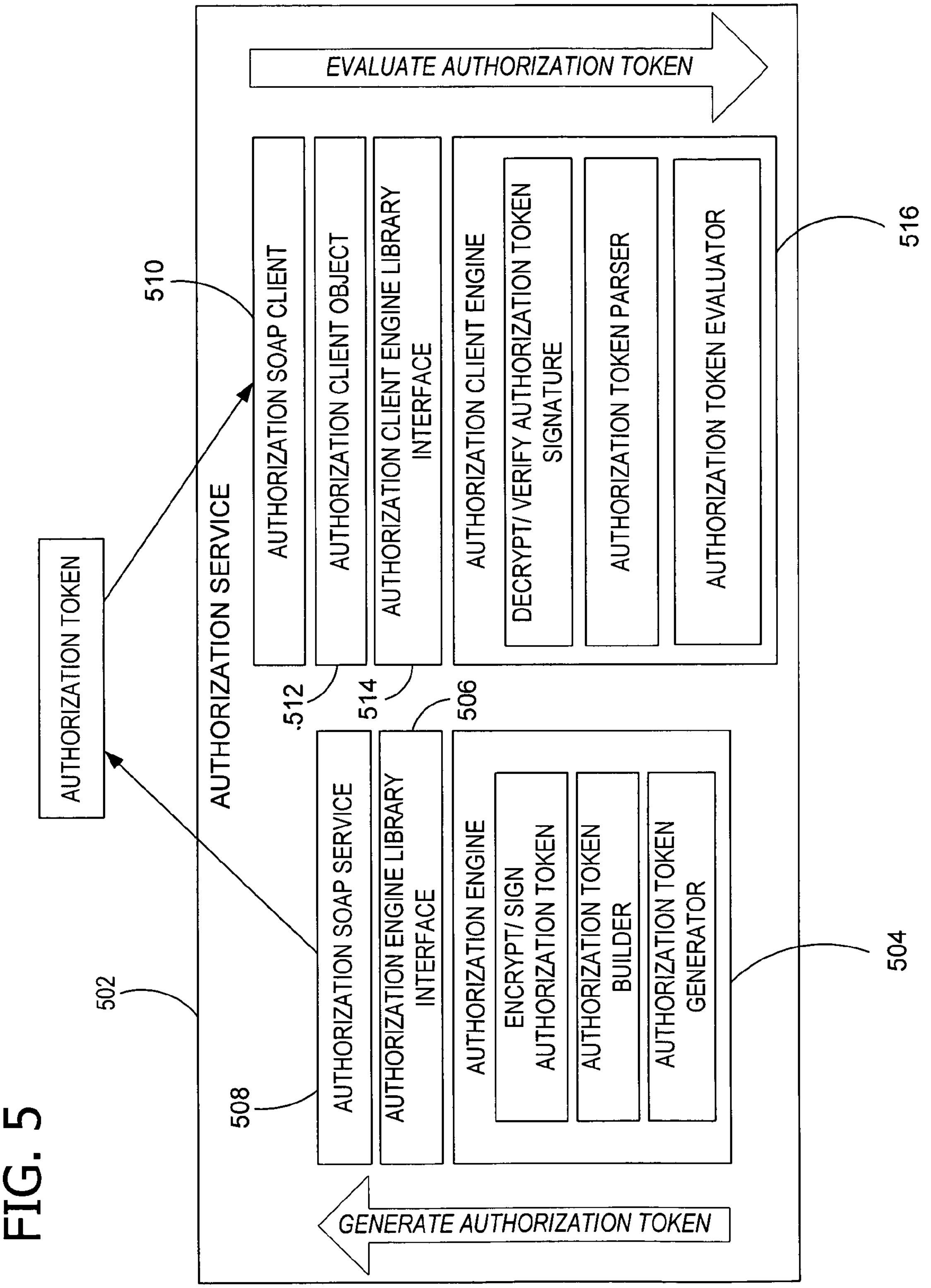
FIG. 5 is an exemplary block diagram illustrating components of the authorization service.

Referring next to FIG. 5, an exemplary block diagram illustrating components of an authorization service 502 according to the invention. In general, the authorization service 502 has computer-readable media associated therewith. The computer-readable media store computer-executable components for implementing the authorization service 502. Exemplary components include an interface component, a parser component, a validation component, an authorization component, and a scope component. The interface component is adapted to receive a request to issue the authorization data for a user based on access rights associated with the user. An authorization component is adapted to issue the requested authorization data responsive to the request received by the interface component.

The interface component is further adapted to receive authorization data. The parser component is adapted to retrieve validation information from the received authorization data. The validation component is adapted to evaluate the retrieved validation information. A scope component is adapted to evaluate an expression in the received authorization data to identify a resource for which access is requested. The interface component is further adapted to send a response indicating the validation status of the received authorization data responsive to the validation component.

In one embodiment, the authorization service 502 generates an authorization token and evaluates an authorization token as illustrated in FIG. 5. In other embodiments, the authorization service 502 includes a central service accessible by a network to generate an authorization token, while a separate authorization client executes local to the client and includes computer-executable instructions for evaluating an authorization token.

The token generation aspect of the exemplary authorization service 502 of FIG. 5 includes an authorization engine 504 for generating the token, building the token, and encrypting and/or signing the token. An authorization engine library interface 506 provides access to the authorization engine. The created token is sent to the client via the authorization SOAP service 508.

The token evaluation aspect of the authorization service 502 in FIG. 5 includes receiving a token from a client via an authorization SOAP client 510. An authorization client object 512 interacts with an authorization client engine 516 via an authorization client engine library interface 514 to evaluate the received token. The authorization client engine 516 includes modules for decrypting or verifying the token signature, for parsing the token, and evaluating the token.

In general, the authorization service 502 includes libraries for converting the received authorization data and the authorization data in the authorization tables to a similar internal format (e.g., two trees), evaluating the two trees to see if the claims match at any given level in the trees thereby allowing the operation. The authorization service 502 further includes an exemplary set of authorization APIs such as for managing the authorization data as shown in Appendix C. Successful and failed authorizations are monitored to create an audit trail of success and failure on every access check. The APIs return an appropriate fault response (e.g., via SOAP) in the event of failure.

Figure 6:
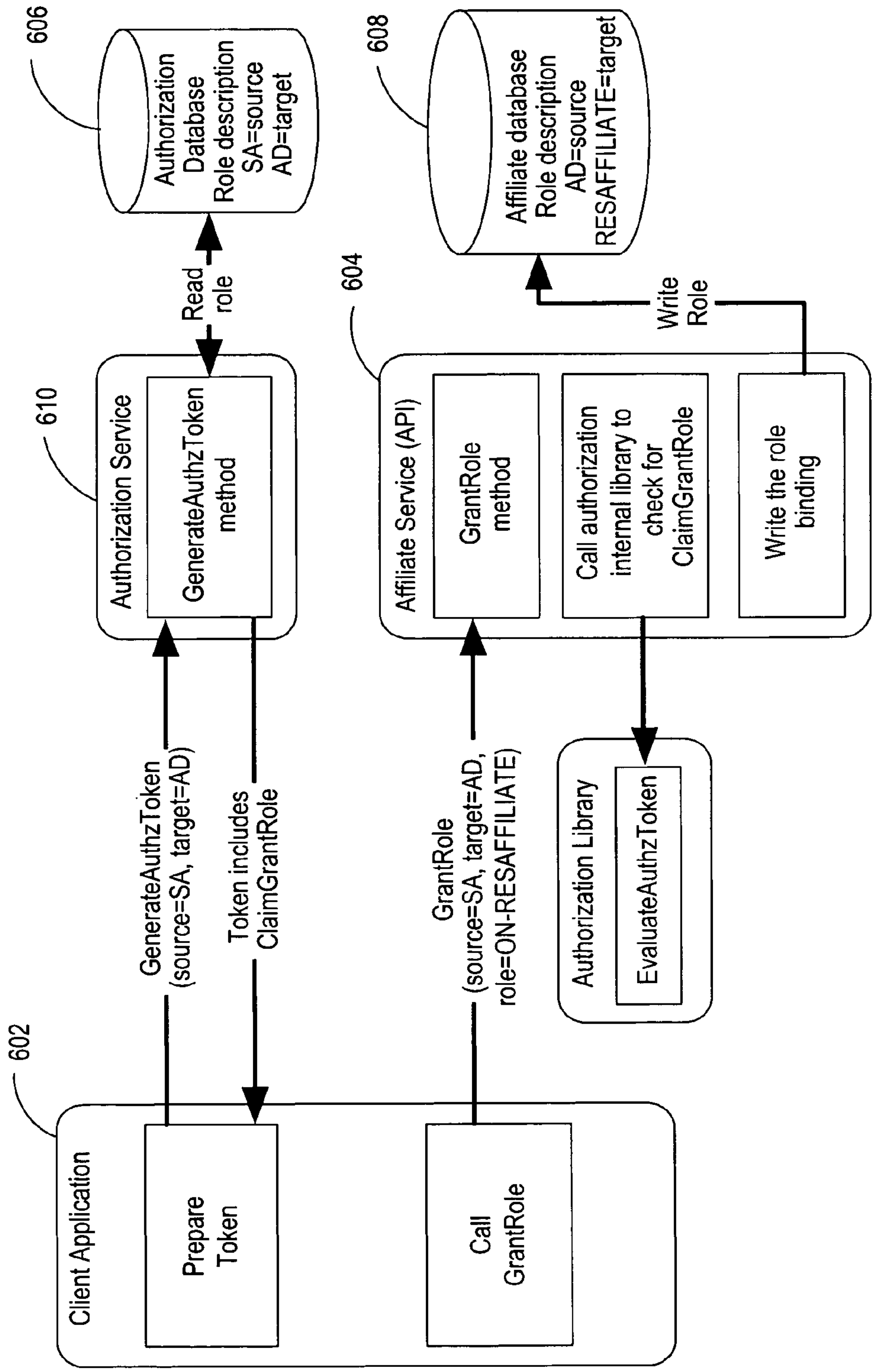
FIG. 6 is an exemplary block diagram illustrating evaluation of authorization data in a role-based embodiment.

Referring next to FIG. 6, an exemplary block diagram illustrates evaluation of authorization data in a role-based embodiment. FIG. 6 shows the data flow that a client application 602 follows to grant a role to a user over resources controlled by the affiliate service 604. In this example, the super administrator (SA) is an account in the authorization database 606, administrator (AD) is an account in the authorization database 606 that receives the role, and the role ON_RESAFFILIATE is to be granted specifies resources in the affiliate database 608. The client application 602 interacts with the authorization service 610 to obtain a token, and then interacts with the affiliate service 604 to grant the role to the user for the affiliate service 604.

Validation

The invention validates the claims based on the authorization data and returns a yes/no response. In one embodiment, the invention checks the signature, expiration time, site identifier of the client application that requested the token to verify that the site asking for validation is the same site that requested the token. Checking the site identifier thwarts replay attacks and man-in-the-middle attacks.

There are different ways of validating the authorization information. A function AuthZCheckType identifies the validation specified by the application or web service interacting with the authorization service. Exemplary methods for validation are embodied as the functions CheckSystemAuthZ, CheckTokenAuthZ, ChecKSystemAndTokenAuthZ, as described in greater detail below.

The CheckSystemAuthZ function checks the authorization requested against the authorization information stored in the authorization database. The authentication data (e.g., a token) that is received by the authorization service is ignored for this type of validation. If the authorization information stored in the authorization database is considered to be accurate, this is a secure method of authorization validation. The authorization data may be NULL for this type of validation. This type of validation may be added to interfaces that do not understand authorization data, highly secure interfaces, or whenever an interface is accessed without explicit authorization data.

The CheckTokenAuthZ function checks the authorization requested against the authorization data that was passed in with the interface call. This check assumes that the authorization data that was issued to the user was digitally signed or encrypted and contains a time stamp. This check does not require access to the authorization database, but rather validates the access based on the authorization information contained in the received authorization data.

The ChecKSystemAndTokenAuthZ function checks the authorization information in the authorization data and the authorization database.

Other validation methods include accepting a call only if the originator matches the owner stamped in the authorization data (e.g., in functions such as EvaluateAuthZToken, EvaluateAuthZTokenForXML). Similarly, validation methods during issuance include building the authorization token only if the originator matches the identity provided in the input source scope. The originator of the call is identified from the authorization data (e.g., provided in the SOAP headers).

Exemplary Operating Environment

Figure 7:
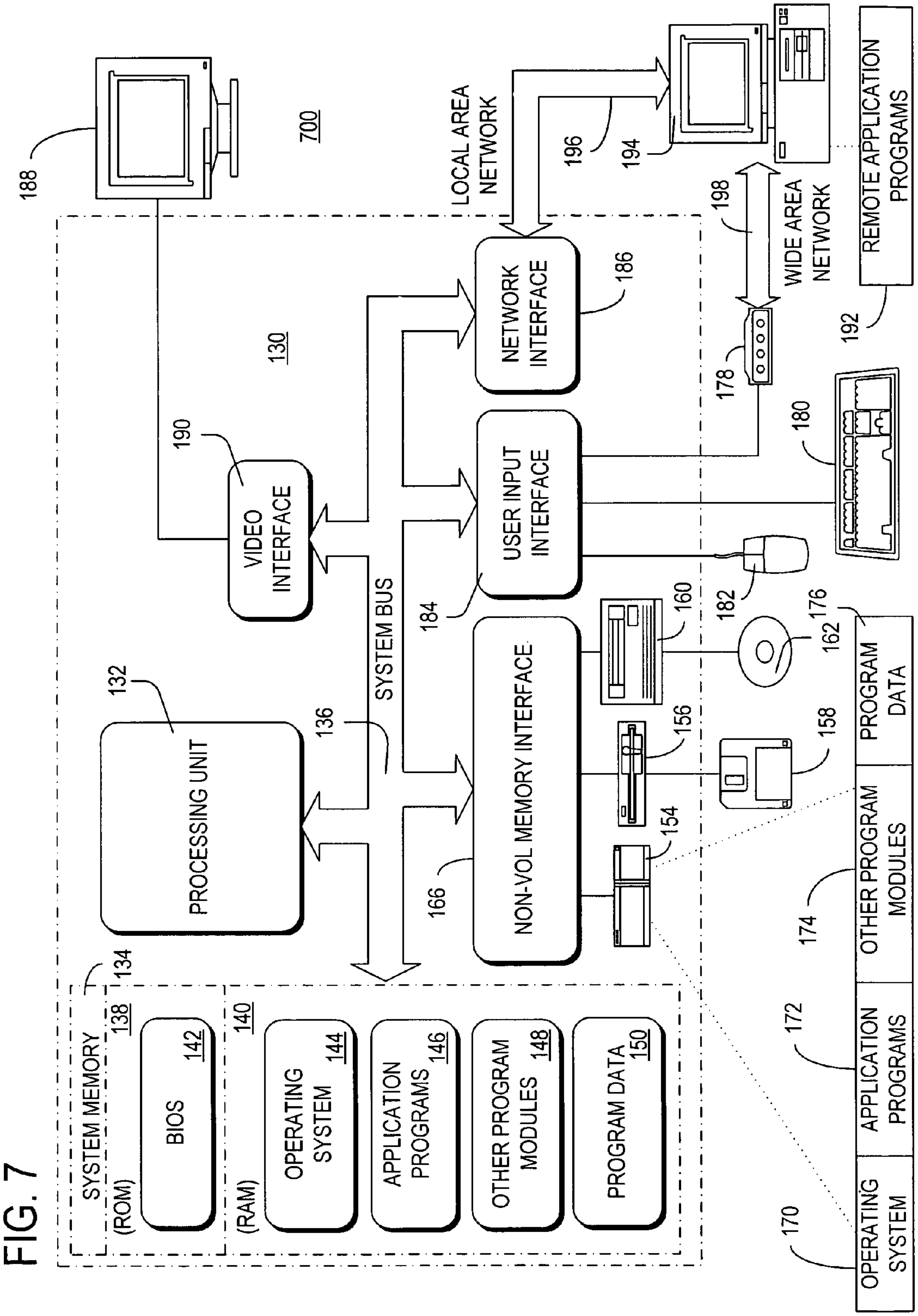
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement an authorization service according to the invention.

Exemplary Network Environment

Figure 8:
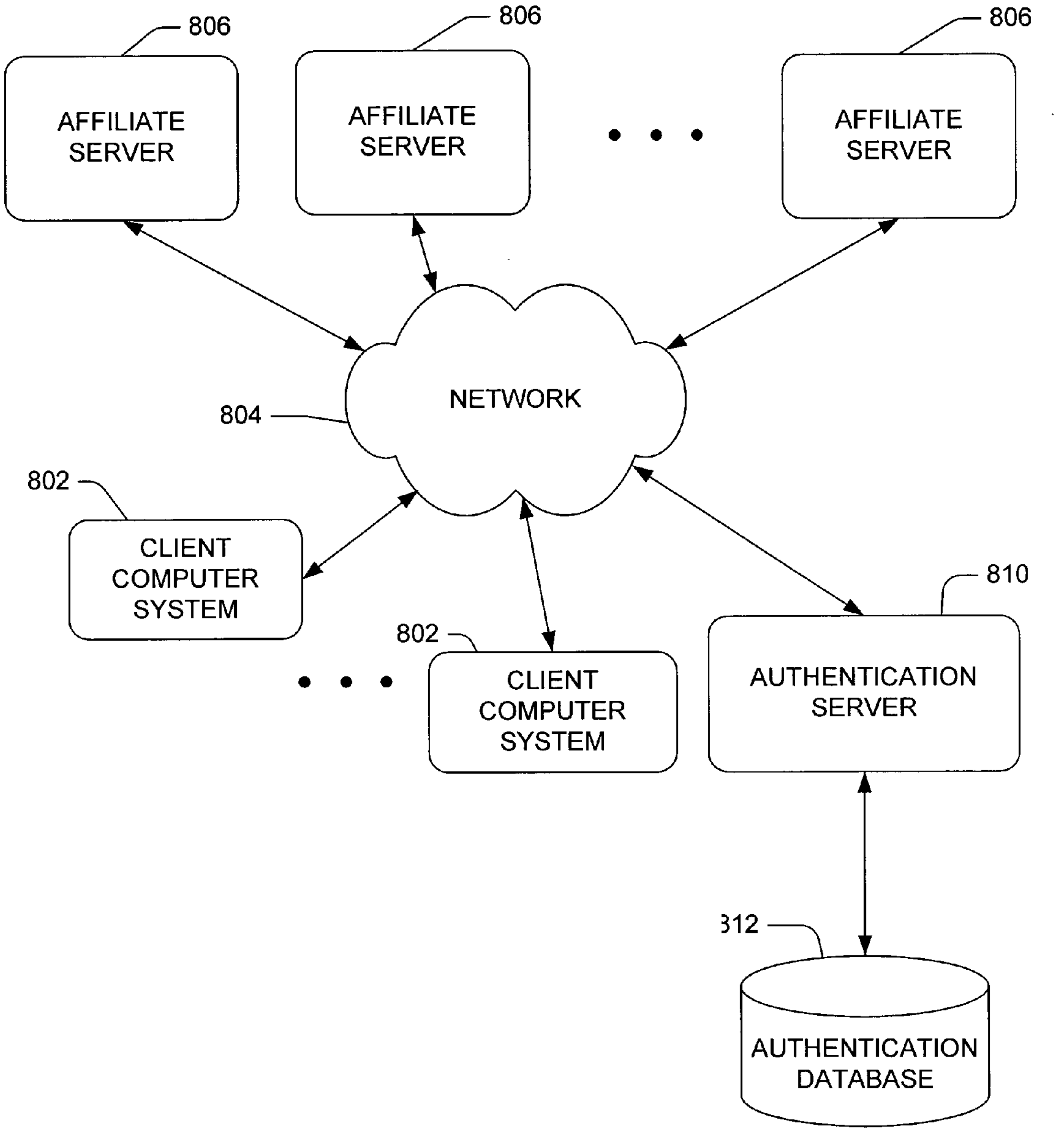
FIG. 8 is a block diagram illustrating one example of a suitable network environment in which the invention may be implemented.

FIG. 8 illustrates an exemplary network environment in which the present invention is utilized in one embodiment. As authorization (e.g., checking permissions associated with a given user) includes authentication (e.g., identifying a user), the invention may be implemented as a supplement or replacement for an authentication systems such as a multi-site user authentication system as illustrated in FIG. 8.

FIG. 8 illustrates cross-network collaboration between web sites as part of a distributed, multi-site user authentication system. Services associated with the web sites provide a user with the ability to access one or more participating web sites or resources with a single sign-in. Although the participating, or affiliate, sites still maintain control over permissions, they use the authentication service rather than hosting and maintaining their own proprietary authentication systems.

In FIG. 8, one or more client computer systems 802 are coupled to a data communication network 804. In this example, the network 804 is the Internet (e.g., supporting the World Wide Web). However, the teachings of the present invention can be applied to any data communication network. Multiple affiliate servers 806 are also coupled to network 804. In turn, the client computer systems 802 can access the affiliate servers 806 via network 804. Affiliate servers 806 are also referred to as web servers or network servers.

The authentication server 810 coupled to network 804 allows communication between itself and client computer systems 802 and affiliate servers 806. Although referred to as an authentication server, authentication server 810 in the illustrated embodiment is also a web server capable of interacting with web browsers and other web servers. In this example, authentication server 810, client computer systems 802, and affiliate servers 806 communicate data among themselves using the hypertext transfer protocol (HTTP), a protocol commonly used on the Internet to exchange information. An authentication database 812 is coupled to authentication server 810. The authentication database 812 contains information (e.g., credentials) necessary to authenticate a user of one of the client computer systems 802 (as well as other users on the network) and also identifies which elements of the user profile information should be provided to a particular affiliate server 806 when the user accesses the affiliate server. In general, a credential includes a means for generating an authenticated reference to a single account identifier. For example, an e-mail address and password, a mobile phone number and a personal identification number (PIN), and a biometric signature are credentials that can be associated with the same profile data.

Although authentication database 812 is shown separately from authentication server 810, it is to be understood that in other embodiments of the invention, authentication database 812 may be contained within authentication server 810. In a federated environment, for example, a plurality of authentication servers 810 may be used to provide authentication.

The authentication server 810, as described herein, authenticates a user of client computer 802 seeking access to a particular one of the affiliate servers 806. Authentication server 810 first requests authenticating login information from the user, such as the user's login ID and password. If the user is successfully authenticated, authentication server 810 routes the user's client computer 802 to the appropriate affiliate server 806 for performing a desired service for the user.

Remarks

The order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Exemplary authorization service APIs are shown below.

A GenerateAuthZToken method has the following exemplary function call.

GenerateAuthZToken([in] BSTR SourceScope, [in] ULONG countTargets, [in, size_is(countTargets)] BSTR*TargetScopeArray, [out] BSTR*AuthzToken)

GenerateAuthZToken accepts a list of target scopes (e.g., profile and credential). The SourceScope is a scope expression of type identity and specifies the account for which the token is generated. The source identity is the same as the originator of the soap call. TargetScopeArray is an array of scope expressions to which the token is bound. AuthZToken is the return value which is an opaque string that can be passed to the other authorization APIs or may be included in the soap headers for other soap services.

An EvaluateAuthZToken method has the following exemplary function call.

EvaluateAuthZToken([in] BSTR AuthzToken, [in] BSTR ResourceScope, [in] ULONG countClaims, [in, size_is (countClaims)] BSTR* ClaimsArray, [out] ULONG*countClaimsGranted, [out, size_is(*countClaimsGranted)] BSTR**ClaimsGrantedArray)

EvaluateAuthZToken accepts a list of claims for evaluation. AuthZToken is a token generated by a call to GenerateAuthZToken. ResourceScope is a scope expression specifying the resource to be accessed (target) and for which this evaluation is requested. ClaimsArray is an array of claim names to evaluate for the given resource scope. ClaimsGrantedArray is an array of claims returned by the evaluation method. This array will contain a subset of the input ClaimsArray for which the access is granted for the given resource. This array is empty if no claim is granted.

An EvaluateAuthZTokenForXML method has the following exemplary function call.

EvaluateAuthZTokenForXML([in] BSTR AuthzToken, [in] BSTR ClaimBindingsXML, [out] BSTR**ClaimsGrantedXML)

EvaluateAuthZTokenForXML is an extension of EvaluateAuthZToken that allows the caller to pass in a set of target scopes (resources) and claim bindings. The evaluation is performed for each claim entry in the ClaimBindingsXML and the result of granted or denied is attached to the xml nodes passed in. The result of the evaluation is returned back to the caller in the form of an XML document. The AuthZToken is a token generated by a call to GenerateAuthZToken. ClaimBindingsXML is an XML following the structure of a claim map. ClaimsGrantedXML is an XML document built from the input ClaimBindingsXML where each claim entry is annotated with an attribute authorization with an integer value of 0/1.

APPENDIX B

Exemplary APIs for managing roles include DefineRole, QueryRole, DenyRole(SourceRootScope, RoleName, TargetRootScope), EnumRolesForSource(SourceScopeName, [out] RoleListXML), and EnumSourcesByRole (RoleName, TargetScopeName, [out] SourceListXML).

The method GrantRole(SourceRootScope, RoleName, TargetRootScope, PolicyXML) defines and assigns a role instance to a specified set of resources. The RoleName is a basic role. The GrantRole API supports both cases of a single identity source as well as an enumeration of identities. The SourceRootScope is a scope expression that is evaluated to either a single resource or to an enumerated scope. GrantRole API evaluates the SourceRootScope and creates a role instance for each resource ID in the source scope. TargetRootScope is an array of scopes. The target resource is a conditional scope defined by an Xpath expression.

Another method is GenerateAuthZToken(SourceScopeName, TargetScopeName, [out] BSTR*AuthZToken). The source scope is a scope expression that resolves to a unique identity. The target scope is a general scope expression that includes the type. In one embodiment, TargetScopeName is an array of scopes or is null (e.g., referring to the entire set of resources accessible to the source).

Another method is EvaluateAuthZToken(AuthZToken, TargetScopeName, numClaims, ClaimArray). The target scope is a general scope expression that includes the type. The scope evaluation takes place in the context defined by the authorization token. The TargetScope is evaluated against the scopes for which the authorization token was generated. The token caches some authorization results and reuses them again when needed. In one embodiment, all the data regarding the role binding is already in the token. However, the scope evaluation might require access to the authorization database dependent on how the evaluator providers implement their functions.

APPENDIX C

An exemplary set of authorization APIs for managing authorization data is described herein. DefineClaim defines a claim. An exemplary XML format of the SOAP action node for this API is as follows:

```
<DefineClaim>
    <ClaimName>ClaimQueryProfilePII</ClaimName>
</DefineClaim>
```

DefineScope defines a scope as an array of resources. Owner defines the resource (e.g., a domain or domain administrator) that is used to control access to the scope, including both the ability to use or query the scope and the ability to modify its definition. The XML format of the SOAP action node for this API is as follows:

```
<DefineScope>
    <ScopeName>DAUser</ScopeName>
    <ResourceArray soapenc:arrayType="xsd:RESOURCEID[1]">
        <RESOURCEID>
            <Name>pageA.net<IName>
            <Type>DA</Type>
        </RESOURCEID>
    </ResourceArray>
    <Owner>
        <Name>pageA.net</Name>
        <Type>DA</Type>
    </Owner>
</DefineScope>
```

QueryScope returns an XML document listing the resources comprising the scope. The XML format of the SOAP action node for this API is as follows:

```
<QueryScope>
    <ScopeName>DAUser</ScopeName>
</QueryScope>
```

AddResourceToScope adds a resource to a scope. In one embodiment, this is done by the user who created the scope. The XML format of the SOAP action node for this API is as follows:

```
<AddResourceToScope>
    <ScopeName>DAUser</RoleName>
    <Resource>
        <Name>pageA.net</Name>
        <Type>DA</Type>
    </Resource>
</AddResourceToScope>
```

RemoveResourceFromScope removes a resource from a scope. The XML format of the SOAP action node for this API is as follows:

```
<RemoveResourceFromScope>
    <ScopeName>DAUser</RoleName>
    <Resource>
        <Name>pageA.net</Name>
```

-continued

```
            <Type>DA</Type>
        </Resource>
    </RemoveResourceFromScope>
```

DefineRole defines a role. RoleTemplateXML is an XML document defining the target resource type to which the role applies, all claims contained in the role, and the relative resources to which they apply. Owner defines the resource (e.g., a domain or domain administrator) that is used to control access to the role including both the ability to use the role and the ability to modify its definition. Calling DefineRole( ) on an already existing role replaces the role template, if called by a user with ClaimDefineRole on the owning domain. The XML format of the SOAP action node for this API is as follows:

```
<DefineRole>
    <RoleTemplate> . . . </RoleTemplate>
</DefineRole>
```

AddClaimToRole adds claims to an existing role definition. Claims are specified in the XML similar to role template. RemoveClaimFromRole removes claims from an existing role definition. Claims are specified in XML similar to role template. QueryRole returns the role template XML. The XML data structure bstrID has the following format:

```
<Role name='. . . '>
    <SourceScope type='res-type'> . . . </SourceScope>
    <TargetScope type='res-type'> . . . </TargetScope>
</Role>
```

GrantRole binds a role, specified by scope name and governed by a specified policy, to a source scope for the specified target scope. This may be used, for example, to assign administrator rights to a site or to a group of users (e.g., if the resource is a scope) as well as to a single user. If PolicyXML is blank or empty, an unconditional binding is created. If GrantRole is called when a binding already exists for the specified Source Root Scope, Role, and Target Scope, the policy entered replaces the policy previously bound. Alternatively, the binding is made unconditional if PolicyXML is blank or empty. A DenyRole method is also available.

The function EnumRolesForSource returns an XML document containing the list of roles assigned to the specified source scope. The caller possesses ClaimEnumRoles on the source scope and the resulting BindingListXML is filtered to only include those involving resources for which the caller possesses ClaimEnumBindings.

EnumSourcesByRole returns an XML document containing the list of Source Scopes assigned the specified role. The caller owns ClaimEnumRoles on the target scope.

What is claimed is:

1. A method of providing from a centralized location access control to a resource for one or more users, said method comprising:

receiving at the centralized location an authorization request from a first entity to issue authorization data for the one or more users based on roles associated with the users as part of an organization model, wherein said authorization data is required by a second entity for allowing the first entity to conditionally access a resource controlled by the second entity;

responsive to the received authorization request, creating a conditional scope expression identifying the resource by a resource name and by at least one property name-property value pair associated with the resource to conditionally define access to the resource, said property name-property value pair determining a list of conditions for access to the resource controlled by the second entity;

encrypting the created conditional scope expression;

responsive to the received authorization request, issuing the authorization data from the centralized location to the first entity, wherein the first entity provides the issued authorization data to the second entity to conditionally access the resource controlled by the second entity, said authorization data including the conditional scope expression identifying the resource said authorization data further including validation information;

receiving at the centralized location a validation request from the second entity to validate the issued authorization data provided to the second entity by the first entity;

responsive to the received validation request, validating the issued authorization data based on the validation information included the authorization data; and responsive to validating the issued authorization data, sending from the centralized location a response to the second entity indicating a determined validation status, said second entity granting to the first entity access to the resource according to the conditions determined by the property name-property value pair when the determined validation status indicates that the authorization data is valid.

2. The method of claim 1, wherein receiving the requests and issuing the authorization data occur over a secure sockets layer.

3. The method of claim 1, wherein receiving the requests and issuing the authorization data occur over a network such as the Internet.

4. The method of claim 1, wherein one or more computer-readable storage media having stored thereon computer-executable instructions for performing the method of claim 1.

5. A method for validating at a centralized location authorization data to provide conditional access to a resource for one or more users, said method comprising:

receiving at the centralized location an authorization request from a client to issue authorization data for the one or more users based on roles associated with the users, wherein said authorization data is required by an affiliate server for allowing the client to conditionally access a resource controlled by said affiliate server;

responsive to the received authorization request, generating at the centralized location an authorization token having a header field, a source field, and a claim field, said header field representing validation information, said source field representing the identity of the user, said claim field specifying the resource conditionally, said claim field including a conditional scope expression identifying the resource by a resource name and by at least one property name-property value pair associated with the resource to conditionally define access to the resource, said property name-property value pair determining a list of conditions for access to the resource controlled by the affiliate server;

sending the authorization token from the centralized location to the client, wherein the client provides the authorization token to the affiliate server to conditionally access the resource controlled by the affiliate server;

receiving at the centralized location over a secure sockets layer a validation request from the affiliate server to validate the authorization token provided by the client, said receiving the validation request comprises receiving a data packet according to the Simple Object Access Protocol (SOAP), and further comprising extracting the authorization token from the received data packet;

responsive to the extracted authorization token, retrieving validation information from the header field of the received authorization token;

responsive to the retrieved validation information, evaluating the retrieved validation information to determine a validation status of the received authorization token; and responsive to the determined validation status, sending from the centralized location a response to the affiliate server indicating the determined validation status, said affiliate server granting to the client access to the resource according to the conditions determined by the property name-property value pair when the determined validation status indicates that the authorization token is valid.

6. The method of claim 5, further comprising evaluating the conditional scope expression to identify the resource.

7. The method of claim 6, wherein evaluating the conditional scope expression comprises extracting a target scope from the received authorization token, said extracted target scope identifying the resource.

8. The method of claim 5, wherein receiving the validation request including the authorization token occurs over a network such as the Internet.

9. The method of claim 5, further comprising decrypting the received authorization token.

10. The method of claim 5, wherein retrieving the validation information comprises retrieving a signature from the header of the received authorization token.

11. The method of claim 10, wherein evaluating the retrieved validation information comprises determining that the retrieved signature is invalid, and wherein sending the response comprises sending a response indicating the invalidity of the received authorization token.

12. The method of claim 5, wherein retrieving the validation information comprises retrieving an expiration date from the header of the received authorization token, and wherein evaluating the retrieved validation information comprises comparing the retrieved expiration date to a current time stamp to determine if the received authorization token has expired.

13. The method of claim 12, wherein the received authorization token has been determined to be expired, and further comprising sending a response indicating the invalidity of the received authorization token.

14. The method of claim 5, wherein one or more computer-readable storage media having stored thereon computer-executable instructions for performing the method recited in claim 5.

15. One or more computer-readable media having stored thereon computer-executable components to control access to a resource by one or more users from a centralized location, said components comprising:

an interface component adapted to receive at the centralized location an authorization request from a first entity to issue authorization data for the one or more users based on roles associated with the users, wherein said authorization data is required by a second entity for allowing the client to conditionally access a resource controlled by said second entity;

an authorization component adapted to issue at the centralized location the requested authorization data for the users based on the roles associated with the users to the first entity, said authorization data including an encrypted conditional scope expression created in response to the received authorization request, said conditional scope expression identifying a resource by a resource name and by at least one property name-property value pair associated with the resource, said property name-property value pair determining a list of conditions for access to the resource controlled by the second entity, and said authorization data including the validation information, wherein said interface component is further adapted to receive a validation request from the second entity, said validation request including the authorization data issued to the first entity;

a parser component adapted to retrieve validation information from the received authorization data; and a validation component adapted to evaluate the retrieved validation information, wherein the interface component is further adapted to send a response from the centralized location to the second entity indicating a validation status of the received authorization data responsive to said evaluating the retrieved validation information, said second entity granting to the first entity access to the resource according to the conditions determined by the property name-property value pair when the determined validation status indicates that the authorization data is valid.

16. The computer-readable media of claim 15, further comprising a scope component to evaluate the conditional scope expression to identify the resource.

17. An authorization system in a centralized location comprising:

a memory area accessible from the centralized location for storing authorization data for use in providing a first entity conditional access to a resource that is controlled by a second entity, said authorization data including an encrypted conditional scope expression created in response to the received authorization request, said conditional scope expression identifying the resource by a resource name and by at least one property associated with the resource, wherein the associated property includes at least one property name-property value pair, said property name-property value pair determining a list of conditions for access to the resource controlled by the second entity, and said authorization data including validation information; and a processor configured to execute computer-executable instructions for receiving a validation request from the second entity and issuing from the centralized location to the first entity, responsive to an authorization request from the first entity, the authorization data for a user based on a role associated with the user and for validating, in response to the validation request from the second entity, the authorization data issued to the first entity to provide access to the resource, said validation request including the authorization data issued to the first entity, said second entity granting to the first entity access to the resource according to the conditions determined by the property name-property value pair when the determined validation status indicates that the authorization data is valid.

18. The system of claim 17, wherein the processor is further configured to execute computer-executable instructions for evaluating the conditional scope expression to identify the resource.

19. The system of claim 17, wherein the authorization data comprises a token.

20. The method of claim 1, wherein the first entity is an application program.

21. The method of claim 1, wherein the first entity is a computing device.

22. The method of claim 1, further comprising generating a signature based on the conditional scope expression identifying the resource, and wherein the validation information includes said generated signature.

23. The method of claim 1 wherein the validation information includes an expiration date.

24. The method of claim 1, wherein the validation information further includes a site identifier identifying the first entity.

25. The method of claim 1 wherein said validation request includes the issued authorization data and wherein said validating includes:

retrieving the validation information from the received authorization data;

evaluating the retrieved validation information; and sending a response to the second entity indicating the validation status of the received authorization data responsive to said evaluating the retrieved validation information.

* * * * *